United States Patent
Weiss et al.

(10) Patent No.: US 11,461,818 B2
(45) Date of Patent: Oct. 4, 2022

(54) COST-ADJUSTING ORDER/QUOTE ENGINE

(71) Applicant: CFPH, LLC, New York, NY (US)

(72) Inventors: David Weiss, New York, NY (US); Antonio Papageorgiou, New York, NY (US)

(73) Assignee: CFPH, LLC, New York, NY (US)

( * ) Notice: Subject to any disclaimer, the term of this patent is extended or adjusted under 35 U.S.C. 154(b) by 0 days.

(21) Appl. No.: 16/990,834

(22) Filed: Aug. 11, 2020

(65) Prior Publication Data
US 2021/0027346 A1 Jan. 28, 2021

Related U.S. Application Data

(63) Continuation of application No. 12/210,826, filed on Sep. 15, 2008, now abandoned.

(60) Provisional application No. 60/972,594, filed on Sep. 14, 2007.

(51) Int. Cl.
*G06Q 40/00* (2012.01)
*G06Q 30/06* (2012.01)
*G06Q 40/04* (2012.01)

(52) U.S. Cl.
CPC ......... *G06Q 30/0601* (2013.01); *G06Q 40/04* (2013.01)

(58) Field of Classification Search
CPC .................................................. G06Q 30/0601
USPC ......................................................... 705/35
See application file for complete search history.

(56) References Cited

U.S. PATENT DOCUMENTS

| | | | |
|---|---|---|---|
| 6,418,419 B1 | 7/2002 | Nieboer et al. | |
| 8,694,398 B2* | 4/2014 | Kemp, II | G06Q 40/00 705/37 |
| 2002/0029181 A1* | 3/2002 | Miller | G06Q 30/0271 705/26.1 |
| 2004/0010452 A1 | 1/2004 | Lacour | |
| 2005/0289039 A1 | 12/2005 | Greak | |
| 2006/0265313 A1 | 11/2006 | Fung et al. | |
| 2007/0109262 A1 | 5/2007 | Oshima et al. | |
| 2008/0071634 A1* | 3/2008 | Rampell | G06Q 30/08 705/26.3 |
| 2008/0243668 A1* | 10/2008 | Ondyak | G06Q 40/04 705/37 |
| 2009/0138368 A1 | 5/2009 | Weiss et al. | |

OTHER PUBLICATIONS

IP.com journal, system, method and computer program product for dynamic pricing (Year: 2005).*
Notification of Transmittal of the International Search Report and the Written Opinion of the International Searching Authority for International Application No. PCT/US08/76432; dated Dec. 5, 2008 (10 pages).

(Continued)

*Primary Examiner* — Bruce I Ebersman
*Assistant Examiner* — John A Anderson

(57) ABSTRACT

Methods and systems are provided that include an order and/or quote engine that automatically adjusts bid, ask, or any other type of order prices to reflect some or all of the costs associated with a trade in an underlying item between a particular party receiving the order or orders accounting for specific costs associated with the party receiving the orders and in certain instances specific costs between the party receiving the order and the party submitting the order.

9 Claims, 3 Drawing Sheets

(56) References Cited

OTHER PUBLICATIONS

The Last Mile: An examination of effects of online retail Delivery Strategies on Consumers ; Esper,Terry L; Jensen; Thomas d ; Turnipseed, Frenanda I; Burton, Scot. Journal of Business Logistics v24n2 pp. 177-203 2003 ISSN: 0735-3766.

* cited by examiner

| Sym | Bid Cust | Bid Size | Bid | Ask | Ask Size | Ask Cust |
|---|---|---|---|---|---|---|
| | | | | | | CstF |
| | | | | 100.02/99.98 | 250 | CstD |
| | | | | 100/100.02 | 250 | CstB |
| BP | CstA | 200 | 98.98/100 | 99.98/100.04 | 500 | CstB |
| | CstA | 200 | 99.96/100 | | | |
| | CstC | 100 | 99.94/99.96 | | | |
| | | | | | | |
| | | | | | | |

Fig. 2

| Sym | Bid Cust | Bid Size | Bid | Ask | Ask Size | Ask Cust |
|---|---|---|---|---|---|---|
| | | | | | | CstF |
| | | | | 99.98/100.02 | 250 | CstD |
| | | | | 101.02/100 | 250 | CstB |
| BP | CstA | 200 | 100/98.98 | 100.04/99.98 | 500 | CstB |
| | CstA | 200 | 100/99.96 | | | |
| | CstC | 100 | 99.96/99.94 | | | |
| | | | | | | |
| | | | | | | |

Fig. 3

COST-ADJUSTING ORDER/QUOTE ENGINE

CROSS-REFERENCE TO RELATED APPLICATION

This application is a continuation of U.S. patent application Ser. No. 12/210,826 filed on Sep. 15, 2008 which claims priority to U.S. Provisional Patent Application No. 60/972,594 filed Sep. 14, 2007, which is hereby incorporated herein by reference.

BACKGROUND

Agency commissions are generally charged by and rebates are generally paid by an agent to the buyer and/or the seller in a trading transaction, with the commission and/or rebate based on anywhere from simple to complex rate formulas. Similarly, transaction fees and rebates related to a trading transaction are often charged or paid to the agent facilitating the trade, with the fee and/or rebate based similarly anywhere from simple to complex rate formulas. Ordinarily, two (2) different buys/sells at the same price on the same potential trading transaction are only equivalent if they have the same overall agency commissions, rebates and/or transaction fees, rebates (hereinafter generally referred to as costs) but will differ in terms of the overall value if the agency costs are different. Accordingly, there is a need for a methods and systems for comparing multiple orders and/or quotes for items in a manner that accounts for these different costs.

SUMMARY OF THE INVENTION

In this respect, the present application generally provides methods and systems that incorporate an order and/or quote engine that automatically adjusts bid, ask, or any other type of order prices to reflect some or all of the costs associated with a trade in an underlying item between a particular party receiving the order or orders and a particular counter-party or parities submitting the order or orders. That is, the quote engine may determine the unit price of the order item accounting for any applicable cost associated with the transaction, such as agency commissions charged or rebates paid to counterparties, or transaction fees or rebates involved in the trade, thereby normalizing the individual price of the item being traded. The normalized order or orders may thereafter be displayed in a market display or otherwise communicated to the party receiving the information in a manner that includes the depth and the resulting Best Bid/Best Offer (BBO), e.g., IBBO (internal BBO), account for some or all of these costs.

In at least one embodiment, a system is provided that comprises a processor and memory, the memory having software associated therewith that when executed causes the processor to perform a method comprising: receiving a request for market data on an item from a computing device associated with a first user; receiving a request for market data on the item from a computing device associated with a second user; retrieving market data for the item, the market data comprising a price associated with an order for the item; retrieving user specific cost data associated with each of the first and second users; determining a normalized price for the order for each of the first and second users based on the respective user specific cost data associated with each of the first and second users; causing an interface screen to be displayed at the first and second user computing devices, the interface screen displayed for the first user comprising the normalized price for the first user and the interface screen displayed for the second user comprising the normalized price for the second user, wherein the normalized price for the first user differs from the normalized price for the second user.

In at least one embodiment, the cost data for each of the first and second users comprises at least one commission formula.

In at least one embodiment, the cost data for at least one of the first and second users comprises a fee formula.

In at least one embodiment, the cost data comprises at least one rebate formula.

In at least one embodiment, the market data comprises a price for each of a plurality of orders for the item, the method further comprising determining a normalized price for each of the orders for each of the first and second users, and wherein the interface screen displayed for the first user comprises a listing of the orders sorted by normalized price and the interface screen displayed for the second user comprising a listing of the orders sorted by normalized price, wherein the sorting for the first user differs from the sorting for the second user.

In at least one embodiment, the method further comprises refreshing and resorting the interface screen to reflect real time changes in the market data for the item.

In at least one embodiment, the interface screen comprises at least one element therein for a user to alternatively resort the orders based on the non-normalized price and the normalized price.

In at least one embodiment, the market data is displayed in a grid in the interface screen, the grid comprising a cell for the normalized price, the non-normalized price, and a size of each of the plurality of orders.

BRIEF DESCRIPTION OF THE FIGURES

FIGS. 2-5 depict various interface screens for use in at least in one of the embodiments of the methods and systems disclosed herein.

DETAILED DESCRIPTION OF THE INVENTION

Figure 1:
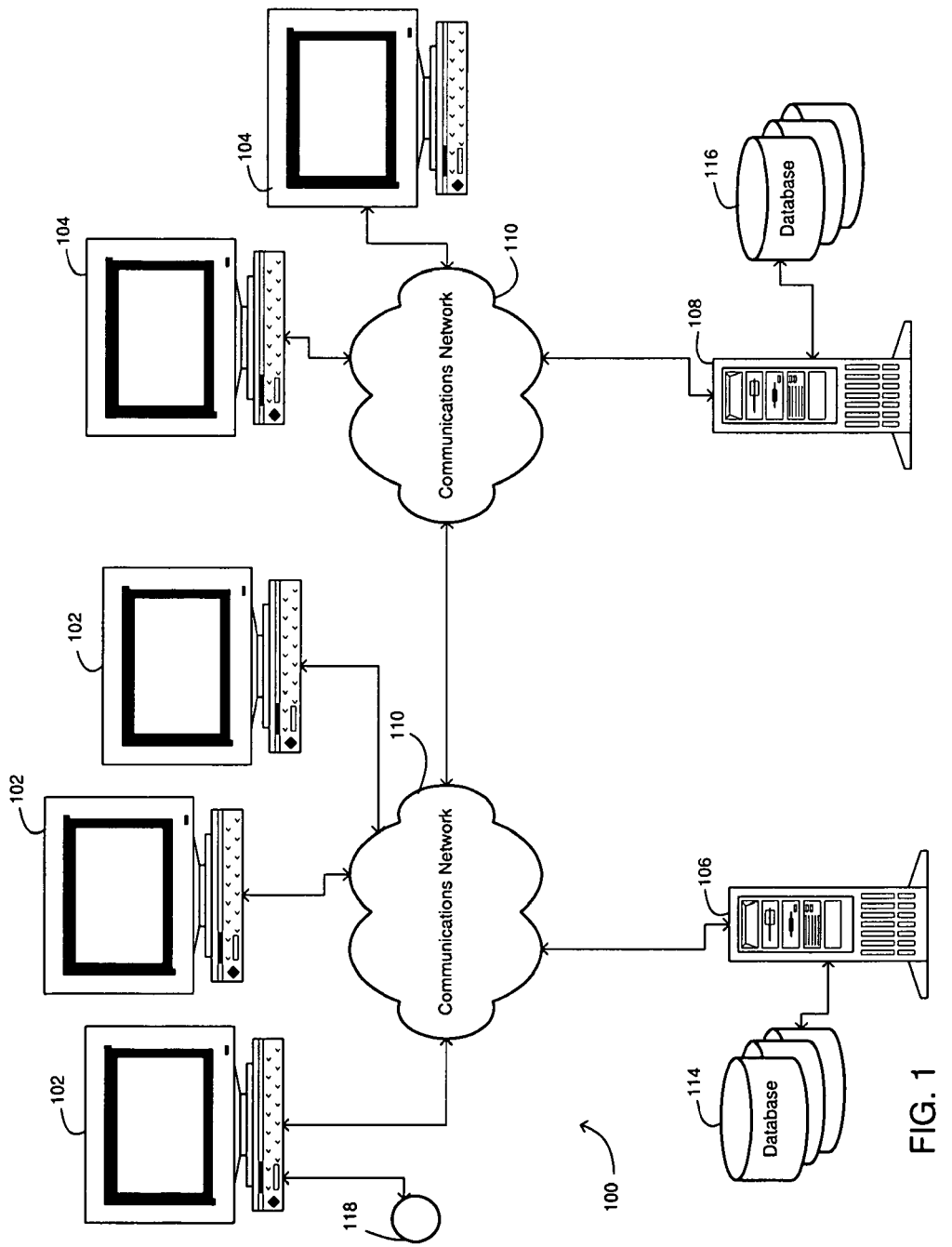
FIG. 1 depicts a system according to at least one embodiment of the systems disclosed herein.

Referring to FIG. 1, a system 100 according to at least one embodiment of the systems disclosed herein includes at least one computing device, such as a remote computer 106, 108, e.g., a server computer, a client computer 102, 104, or a combination thereof. The term remote in this context merely means that the remote computer 106, 108 and at least one of the client computers 102, 104 are separate devices. Thus, the devices may be remote even if they are located within the same room. In at least one embodiment, the system includes at least one remote computer 106, 108 that is connected over a communication network 110 to one or a plurality of client computers 102, 104. One or more of the internal client computers 102, 104 may be connected to the remote computer 106, 108 through a firewall.

The system 100 may be implemented over any type of communications network 110, such as a local area network (LAN), a wide area network (WAN), the Internet, a telephone network (POTS), a wireless network, including cellular, WiFi, and WiMax networks, or a combination of wired and/or wireless networks. In certain instances, the communications network 110 may be independent of the Internet or limited with respect to the type of the information transmitted over the Internet, such as to information that poses little or no security risk if misappropriated or that has been encrypted.

In the networked embodiment, client computer(s) 102, 104 are preferably configured or otherwise capable of transmitting and/or receiving communications to and/or from the remote computer(s) 106, 108. This may be accomplished with a communication element, such as a modem, an Ethernet interface, a transmitter/receiver, etc., that enables communication with a similarly equipped remote computer(s) 106, 108 wirelessly, wired, or a combination thereof. It is understood that the relative functionality described herein may be provided by the exchange computer(s) 106, 108, by the client computer(s) 102, 104, or both, and is thus not limited to any particular one of the implementations discussed herein. In at least one embodiment, the client computer(s) 102, 104 will generally provide the front-end functionality and the remote computer(s) 106, 108 will provide the back-end functionality. In at least one embodiment, at least two sets of client and remote computers are provided, e.g., internal client and server/exchange computers (102, 106, respectively) and external client and server/exchange computers (104, 108, respectively).

The term internal and external generally denote belonging to one of two groups. One belongs to an internal group if one or more criteria are satisfied that define the internal group. One belongs to the external group if the one or more criteria are not satisfied. Various types of criteria may define the internal group, including memberships or affiliations. Grouping may also be hardware specific as well as individual specific. For instance, the internal group may include some or all employees of a company, members of an organization, or members of any other collective. Similarly, the internal group may include all individuals authorized to access the functionality of the system 100 as described herein. For example, the internal group may include all equity derivative traders of a company or equity derivative traders that subscribe to the trading services provided by the company. Alternatively or additionally, the internal group may include all equity derivative traders authorized to access the backend functionality provided by the internal server computer 106.

Although various embodiments may be described herein in relation to certain types of financial instruments, such as agencies or equity derivatives, it is understood that the methods and systems disclosed herein are equally applicable to other types of financial instruments as well as non-financial instrument items, consumer and industrial goods, such as automobiles, services, e.g., mortgage or other loan services, etc., and is thus not limited thereto. The term "financial instrument" denotes any instrument, issued by a corporation, government, or any other entity, that evinces dept or equity, and any derivative thereof, including stocks, bonds, debentures, certificates of interest or deposit, warrants, options, futures, forwards, swaps, or generally any security. The methods and systems disclosed herein may be used, for example, in a gaming environment for finding opposing parties or teammates for game play in various networked or non-networked casino and non-casino type games.

The computing device, e.g., the client computers 102, 104 and/or the remote computers 106, 108, generally include at least one processor, and a memory, such as ROM, RAM, FLASH, etc., or any computer readable medium, such as a hard drive, a flash-drive, an optical or magnetic disk, etc. The memory or computer readable medium preferably includes software stored thereon that when executed performs one or more steps of the methods disclosed herein, including communicating data and commands back and forth between the computers, displaying interface screens, etc. The computers may also be associated with or have access to one or more databases 114, 116 for retrieving and/or storing the various types of data discussed herein, including identity verification data, such as an ID and password, biometric data, etc., internal and/or external trade/order and market data, account data, communication preferences, templates, cost data, such as commissions, rebates, fees, user preferences, etc. The cost data may be defined as formulas that take into account, e.g., the size of the order or any other order term. The cost data may also be user and/or counterparty specific. That is, the commission between a user and a counterparty may differ from another user and the counterparty. In this instance, the specific commission or other cost data applicable to each party and/or counterparty may be stored in the database or databases 114, 116 for each user/counterparty. The cost data may also be stored locally at each client device 102, 104.

The client computers 102, 104 may include, without limitation, a mobile phone, PDA, pocket PC, personal computer, as well as any special or other general purpose computing device. As such, the client computer 102, 104 preferably includes a processor, a memory, a display, such as a CRT or an LCD monitor, for displaying information and/or graphics associated with the functionality provided by the system 100, and at least one input device, such as a mouse, a touch-sensitive pad, a pointer, a stylus, a trackball, a button or a plurality of buttons, e.g., alphanumeric, a scroll wheel, a touch-sensitive monitor, etc., or a combination thereof, for users to enter commands and/or information relevant to the system's functionality. With the general purpose type of client computer 102, 104, such as the PC or PDA, users may access the functionality provided by the system 100 with a browser application or any other generic application, or with special purpose software designed specifically for accessing the functionality disclosed herein.

In at least one embodiment, the client computer 102, 104 includes or is otherwise associated with at least one biometric sensor 118. The biometric sensor 118 is any device that is used to determine directly from the user at least one item of biometric data associated with a user, such as a fingerprint reader, an iris scanner, a retinal scanner, a vascular pattern reader, a facial recognition camera, etc. The biometric sensor 118 may be embodied in hardware, software, or a combination thereof. The biometric sensor 118 may further share resources with other components of the client computer 102, 104, such as the processor, memory, a camera, a microphone, a speaker, etc. A single biometric sensor 118 may be used for reading more than one type of biometric data. For example, a digital camera may be used to obtain an image of the user's eye for iris scanning and an image of the user's face for facial recognition. In this instance, a single image capture of the user's face may provide the data for facial recognition as well as data for iris or retinal comparisons.

The biometric data is generally obtained with the biometric sensor 118 and used at least to authenticate the identity of the user as a gateway for allowing the user to access the system's functionality. In this regard, biometric data may be compared with previously obtained/stored biometric data that has preferably been verified as being associated with a particular user and access to the system's functionality may be provided based on a positive match thereof.

In at least one embodiment, the system 100 provides functions relevant to trading financial instruments or other items in one or a plurality of exchanges, such as an internal exchange, e.g., an over the counter (OTC) exchange, and an external exchange, e.g., a public exchange, an external (OTC) exchange, an electronic communication network (ECN), etc. An exchange generally includes or otherwise supports at least one or a plurality of markets. In this respect, the system 100 allows users, such as traders, brokers, dealers, customers, market makers, etc., to access market data and submit orders to one or more exchanges, e.g., the internal and/or the external exchange, using at least one client computer 102, 104. The term orders as used herein includes actual orders, such as bids, offers, buys, sells, requests for quotes (RFQs), quotes, etc., and indications of interest (IOIs), etc. It is understood that a user may be acting in a principal or agency capacity. Therefore, the acts disclosed herein as being performed by a user, include acts of the principle and acts of the agent. For example, when referring to a user submitting an IOI, this includes a broker submitting an IOI for a customer as well as the customer submitting the IOI on his own behalf.

An indication of interest (IOI) includes any expression indicating that the submitting party or a customer thereof is interested in an item, which generally includes any communication relating to a traded item that is not a quote, a buy, sell, bid, or offer. An IOI therefore specifies at least one trading variable, such as the item name or symbol, whether a buy side or sell interest, the size of the interest, the price, etc. IOIs differ from actual orders in that the IOI is missing at least one of the trading variables. For example, an IOI may specify an item name, symbol, or description, e.g., IBM. In this instance, IOI indicates broadly that a user is interested in IBM without any indication whether the user is interested in buying or selling, the price, or the size of the interest. The IOI does not need to identify any specific item. Rather, the IOI may identify items by type or any other common data item between the items. For example, a user may submit an IOI that indicates an interest to buy or sell derivatives on large cap underlyiers.

In at least one embodiment, the system 100 generally receives orders (internal and/or external) and stores the orders in one or more databases. The system 100 may also receive and store external data related to orders, such as news regarding trading activity for particular items. The system 100 may group orders for particular items, e.g., financial instruments, to create a market for each item that includes at least one order for the item. The system may also cause an interface screen to be displayed, such as the market display screen shown in FIG. 2, e.g. at the client computer 102, with the relevant market data included therein. The market for each item may be managed or worked by users on a manual, a semi-automatic, or an automated exchange. That is, orders may be executed with the system, either automatically and/or manually.

Data from the orders received by the system 100 generally provide at least a portion of the information used herein. Various types of data may be maintained in this respect, such as the item name and/or symbol, size, price, execution date and/or time, posting date and/or time, buyer/seller name and/or identification number, account numbers, order type, etc. In at least one embodiment, the system maintains for each user, e.g., trader, dealer, broker, etc., a record in at least one database that includes at least one of: the user name, contact information, a user ID, e.g., a dealer or trader ID, an internal desk ID, and one or more communications addresses, e.g., voice, fax, e-mail, instant message (IM), financial information eXchange (FIX) protocol, execution management system (EMS), associations with other users, traders, and/or customers, cost data, etc. With regard to cost data, one or more database may be maintained that includes user and/or counterparty specific cost formulas therein. The costs themselves may be specific between particular users and counterparties, and between groups of users and counterparties. For example, orders between a user affiliated with ABC group and a particular counterparty may pay commissions based on a first fee formula and orders between a user affiliated with DEF group and the particular counterparty may pay commissions based on a second fee formula. Commissions may similarly be different between subgroups within the group. In these instances, users may be associated with one or more groups, and fees may be associated with the group. Commissions may also be different based on trade data. For example, trades associated with certain types of items may be subject to a fee formula different than other types of items or different order sizes or types. Fee data may be maintained in this respect for the system 100 to determine the applicable fee structure for the order. Simple to complex formulas for calculating agency commissions/rebates and/or transaction fees/rebates may use volume or notional value (volume×price) as the primary factor, and the calculation for the adjustment to the bid and/or ask may include the volume or notional value of the bid and/or ask for any give order/quote/price. In certain embodiments, the costs and/or the normalized prices may reflect any applicable tax or tax savings.

Individual user sessions for access to the relevant functionality of the system 100 may begin with a user logging into the system. That is, a user may login to place one or more orders for execution, view or otherwise access market data for one or more items. Login generally entails receiving identification information from the user, such as a login ID, password, biometric data, etc., and verifying therewith that the user is authorized to access the relevant functionality of the system 100.

In at least one embodiment, the system 100, in response to a request or a query for market data for a particular item causes an interface screen to be displayed, such as the interface screens shown in FIG. 2, which includes therein at least one item of normalized market data therein. That is, for all or at least one order/quote in a market, the system 100 determines the applicable cost and calculates the price for the order/quote accounting for the applicable cost, e.g., agency commission-/rebate-adjusted and/or transaction fee-/rebate adjusted bid and/or ask by calculating the agency commission/rebate and/or fee, or a combination thereof, which will generally entail adding to or subtracting the computed cost from the price for the item. In instances where the cost is computed based on the overall price of the transaction, the expected overall price may be divided by the size of the order to determine the applicable cost per item, which may then be added to or subtracted from the price of the item. The applicable cost data may be maintained based on either a manual entry of, e.g., the agency commission/rebate and/or transaction fee/rebate or a simple to complex formula of the agency commission/rebate and/or transaction fee/rebate.

In at least one embodiment, the interface screen includes the normalized order therein relative to the normalized BBO for the item. That is, some or preferably all of the orders making up the market for the item may be compiled, normalized, and the (normalized) BBO may be determined therefrom e.g., from agency commission-/rebate-adjusted and/or transaction fee-/rebate-adjusted bids/asks. The normalized orders are preferably sorted in a logical order from the BBO, e.g., in an ascending, descending, etc. order. In this respect, counterparties/buyers/sellers viewing or otherwise receiving the normalized market data may evaluate the prices after being agency commission-/rebate-adjusted allowing them to make the best trade in terms of the overall price of the transaction. Whereas without the normalized market display, the best base price might appear to be the best trade, but a relatively high agency commission/low agency rebate associated with the order may result in the order being inferior in relation to other orders with a higher base price and a relatively low agency commission/high agency rebate. Similarly, agents/dealers/brokers/traders may evaluate the prices after being transaction fee-/rebate-adjusted allowing them to make the best trade. The best base price might appear on its face to result in the best trade, but a relatively high transaction fee/low transaction rebate associated with the order cause the order to be inferior in terms of the overall price of the transaction not to be preferable to an order with an inferior base price and a relatively low transaction fee/high transaction rebate. Agency commission/rebate and transaction fee/rebate adjustments may be combined in those instances where the counterparties/buyers/sellers pay for both in a trading transaction.

In at least one embodiment, the market display is updated to reflect changes in the market price of the item, preferably in real time, e.g., as new orders enter the system 100. Alternatively, the system may be refreshed manually, e.g., on demand with a selection of a button or other element that when selected causes the data to be refreshed. In this instance, as new orders for the items are received by the system 100, the system 100 preferably normalizes the newly received order and updates the interface screen accordingly. For example, if the new order is better than the BBO, then the BBO is replaced in the interface with the new normalized order and the previous BBO and other orders are displayed relative to the new BBO. In instances the new order does not beat the BBO, the new order displaces orders that are bested in terms of price in the market display. For example, orders that are beaten may be displayed farther away from the BBO when displaced by the new order.

The normalized orders, e.g., the adjusted orders/quotes may be displayed in any of a number of ways. For example, the orders may optionally be displayed with various formatting and highlighting (e.g., color-coded) associated with their adjustment types. For instance, orders that are normalized may be displayed as bold, as shown in FIG. 2, or in a certain colors whereas orders that are not normalized may be displayed in normal type, as shown in FIG. 2, or a difference color, respectively. Alternatively or additionally, the normalized and the base price may both be displayed for particular orders. For example, both prices may be shown in a single cell with one price disposed in one area of a cell and the base price in another area. For example, an order with a 100 base price and a 99.98 normalized price may be displayed as 99.98/100 as shown in FIG. 2. Adjusted orders/quotes may also be displayed side-by-side or comparatively with unadjusted orders/quotes (directly inline, as a popup that appears over the quote with a mouse over, or on a secondary screen).

Figure 4:
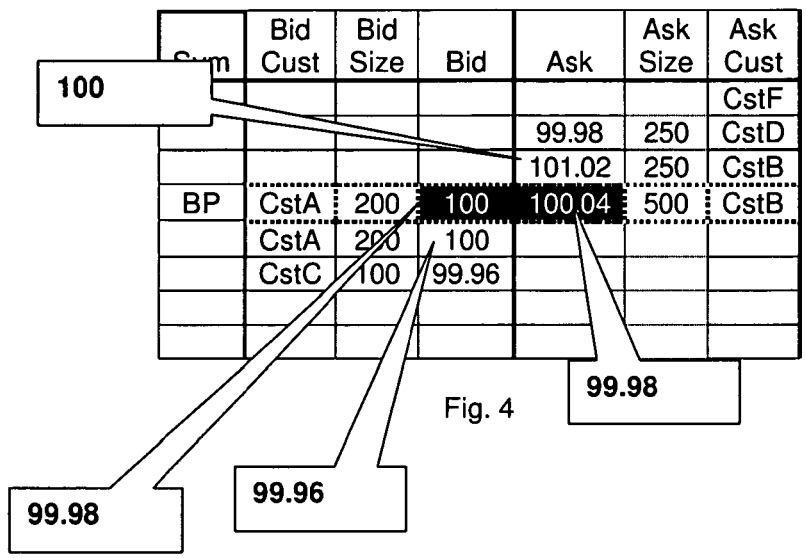
Figure 5:
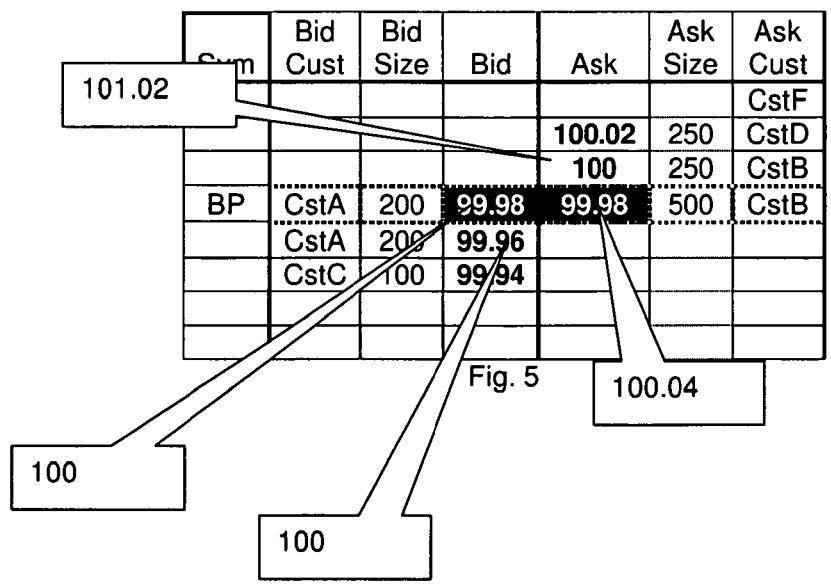

The interface screen may also include a button or other element that when selected causes the normalized prices to be replaced with the base price and the order, and preferably the BBO may be adjusted/sorted accordingly. For example, the 99.98/100 normalized/base positioning may be flipped to a base/normalized price of 100/99.98, as shown in FIG. 3. Side-by-side, inline, popups, and secondary screens may similarly be flipped and resorted accordingly where applicable (compare FIG. 3 to FIG. 4). In some embodiments, the sorting may remain constant, e.g., based on the normalized price, even though the reverse display has been enabled. Thus, although the base price may be shown primarily, the sort may be based on the normalized price, as shown in FIG. 4. As a result, in certain instances, the orders in the market display may appear to be unsorted.

In at least one embodiment, users are able to select or otherwise accept an order being displayed. In this instance, the system 100 receives the acceptance and applies the base price of the order to the transaction. The system 100 may also match orders with counter orders. In this instance, the match may be based on matching base prices, normalized prices, and/or overall transaction prices. The base price of the orders may similarly be applied to the executed transaction. The users and counterparty accounts may thereafter be updated to reflect the orders executed against the accounts. The steps discussed herein may be repeated in whole or in part.

Therefore, in certain embodiments, when an agent/dealer/broker/trader enters orders and works markets or a counterparty/buyer/seller evaluates prices, they can choose to enter or have calculated agency commissions/rebates and/or transaction fees/rebates for a specific order/quote in a market that differs from the rest in the other orders/quotes in that market and then have the agency commission-/rebate-adjusted and/or transaction fee-/rebate-adjusted bid/ask calculated so that it can be represented alongside the other orders/quotes in a normalized manner. Once the buys and sells are adjusted with agency commissions/rebates and/or transaction fees/rebates, the trading prices can be compared with the variable agency commissions/rebates and transaction fees/rebates for the potential trade factored in before the trade is actually made. The more fragmented or highly quoted a market, the greater the likelihood of variability in agency commissions/rebates and/or transaction fees/rebates, and a as a result the greater the value of normalizing the pricing in that market to adequately compare true pricing of a potential trade to aid in determining the best trade to make.

While the foregoing invention has been described in some detail for purposes of clarity and understanding, it will be appreciated by one skilled in the art, from a reading of the disclosure, that various changes in form and detail can be made without departing from the true scope of the invention.

What is claimed is:

1. An apparatus comprising:
   a network interface;
   a memory;
   a display device;
   at least one processor configured to:
   receive from a user a request for market data associated with an item;
   retrieve market data for the item, the market data comprising a price associated with an order for the item;
   retrieve, via the network interface, user specific cost data associated with the user and at least one other user;
   determine a first normalized price for the order based on respective user specific cost data associated with the user, and a second normalized price for the order for the at least one other user; and
   render an interface screen on the display device comprising the first normalized price for the user,
   wherein the first normalized price for the order for the item for the user differs from the second normalized price for the order for the item for the at least one other user,
   wherein the at least one processor is further configured to render the market data in a grid in the interface screen, the grid comprising a cell for the first normalized price, a non-normalized price, and a size of each order, and wherein the at least one processor is further configured to render, on the display device, order data in an order listing with order depth below a best bid and/or best offer such that a plurality of orders in the order depth are displayed with prices normalized for transaction costs.

2. The apparatus of claim 1, wherein the market data comprises a price for each of a plurality of orders for the item.

3. The apparatus of claim 1, wherein the at least one processor is further configured to render on the display device a listing of orders sorted by a given normalized price, the orders being customized for the user.

4. The apparatus of claim 1, wherein the at least one processor is further configured to refresh and resort the interface screen to reflect real time changes in the market data for the item.

5. The apparatus of claim 4, wherein the interface screen comprises at least one element for the user to alternatively re-sort orders based on a non-normalized price and the first normalized price.

6. The apparatus of claim 1, wherein the at least one processor is further configured to determine the first normalized price for the order for the user based on at least one commission formula in order to determine cost data.

7. The apparatus of claim 1, wherein the at least one processor is further configured to render a plurality of orders on the display device at normalized prices computed to reflect respective transaction cost rates.

8. The apparatus of claim 1, wherein the market data includes at least one of a user-specific fee, rebate or commission associated with the order for the item,
wherein the first normalized price differs from the second normalized price because of a difference in the user-specific fee, rebate or commission for the order for the item between the user and the at least one other user.

9. A method in an electronic device, comprising:
receiving from a request for market data associated with an item;
retrieving, via at least one processor, market data for the item, the market data comprising a price associated with an order for the item;
retrieving, via a network interface, user specific cost data associated with a user and at least one other user;
determining, via the at least one processor, a first normalized price for the order based on respective user specific cost data associated with the user, and a second normalized price for the order for the at least one other user; and
rendering an interface screen on a display device comprising the first normalized price for the user,
wherein the first normalized price for the order for the item for the user differs from the second normalized price for the order for the item for the at least one other user
wherein the at least one processor is further configured to render the market data in a grid in the interface screen, the grid comprising a cell for the first normalized price, a non-normalized price, and a size of each order, and
wherein the at least one processor is further configured to render, on the display device, order data in an order listing with order depth below a best bid and/or best offer such that a plurality of orders in the order depth are displayed with prices normalized for transaction costs.

* * * * *